United States Patent [19]

Barnett

[11] 4,179,852
[45] Dec. 25, 1979

[54] METHOD AND APPARATUS FOR POLISHING FLOPPY DISCS

[75] Inventor: David L. Barnett, Phoenix, Ariz.

[73] Assignee: Three Phoenix Company, Phoenix, Ariz.

[21] Appl. No.: 885,625

[22] Filed: Mar. 13, 1978

[51] Int. Cl.² ............... B24B 5/00; B24B 1/00
[52] U.S. Cl. ..................... 51/132; 51/281 SF
[58] Field of Search ............. 51/104, 131 B, 132, 51/118, 281 R, 281 C, 281 P, 281 SF, 117, 129; 15/21 C; 274/47

[56] References Cited

U.S. PATENT DOCUMENTS

| | | | |
|---|---|---|---|
| 1,576,769 | 3/1926 | Lutz | 51/118 |
| 2,696,067 | 12/1954 | Leach | 51/131 B |
| 2,805,525 | 9/1957 | Napp | 51/118 |
| 3,289,663 | 12/1966 | Cary | 51/105 R |
| 3,486,274 | 12/1969 | David | 51/132 |
| 3,601,932 | 8/1971 | Elliott | 51/132 |
| 3,818,649 | 6/1974 | Klievoneit | 51/327 |
| 3,863,395 | 2/1975 | Brown | 51/401 |
| 3,943,666 | 3/1976 | Dion et al. | 51/132 |

FOREIGN PATENT DOCUMENTS 851616  10/1952  Fed. Rep. of Germany ......... 51/131 B

OTHER PUBLICATIONS

Magnetic Disk Treatment, Barth et al., IBM Technical Disclosure Bulletin, vol. 14, No. 5, Oct. 1971.

Primary Examiner—Harold D. Whitehead
Assistant Examiner—K. Bradford Adolphson
Attorney, Agent, or Firm—Cahill, Sutton & Thomas

[57] ABSTRACT

A method and apparatus for uniformly polishing the magnetic recording layer of a floppy disc by producing uniform relative velocities between the magnetic oxide material and the polishing medium across the floppy disc. The floppy disc is placed on a circular resilient pad disposed on a first spindle-mounted circular platen. A circular fibrous or abrasive polishing disc is disposed on a second spindle-mounted circular platen. The radius of the polishing disc is greater than the width of an annular region to be polished on the floppy disc, so that the relative velocities between points of the polishing disc and adjacent points of the floppy disc are uniform. Uniform polishing of the annular region results when the rotating polishing disc contacts the annular region of the rotating disc when the first and second platens are rotated in the same angular direction, at first and second predetermined angular velocities, respectively.

21 Claims, 6 Drawing Figures

METHOD AND APPARATUS FOR POLISHING FLOPPY DISCS

BACKGROUND OF THE INVENTION

1. Field of the Invention

The invention relates to polishing of recording elements such as floppy discs to eliminate recording layer defects by providing intimate contact between the recording material and the magnetic head.

2. Description of the Prior Art

Floppy discs are flexible annular recording discs which are used for digital data storage in data processing systems. Typically, a floppy disc (also commonly referred to as a "flexible disc") includes an annular mylar substrate coated on both sides with a very thin magnetic oxide layer including many minute magnetic oxide particles dispersed in a resin binder. Various techniques for polishing or burnishing the magnetic oxide to remove protruding particles of iron oxide or lumps of binder material formed in the manufacture of the magnetic layer. (The term "polishing" is the technically correct term for describing the above operation of removing protruding particles of iron oxide etc. However, the term "burnishing" is the term ordinarily utilized by those skilled in the art, and is the term hereinafter used in the descriptive portion of this patent application to mean "polishing". The technically correct term "polishing" is utilized in the claims.) If the protruding particles are not removed or smoothed, the magnetic heads (which record and sense digital information into and out of the magnetic oxide layer, also referred to as the magnetic recording layer) are raised slightly as they pass over such particles. It is known that the accuracy or fidelity of both recording and sensing of information in the magnetic recording layer depends upon very "intimate" or close contact between the magnetic head and the magnetic recording layer surface. If such intimate contact is momentarily lost (because the magnetic head is raised slightly as it passes over a protruding particle of the magnetic recording layer), digital information may be "lost".

The state of the art of burnishing flexible recording elements, such as floppy discs, to remove or smoothen protruding particles and high spots from their recording surfaces is exemplified by U.S. Pat. No. 3,943,666, assigned to Dysan Corporation, and by the article, *Magnetic Disc Treatment*, IBM Technical Disclosure Bulletin, Volume 14, No. 5, Oct. 1971.

The known techniques for burnishing a floppy disc involve placement of the floppy disc on a resilient surface of a rotating platen and bringing a hard abrasive member such as a ceramic disc or blade in contact with the recording surface of the rotating floppy disc, thereby abrading and smoothening an annular region of the magnetic oxide layer. However, such techniques produce non-uniform removal of material from the annular region of the recording layer, due to the variations in relative velocities between the abrasive member and the inner and outer portions of the annular region. Consequently, the inner portions of the annular region may be underburnished, or the outer portions may be overburnished. The manufacturing yield is thereby reduced, increasing the final cost of the floppy discs.

The cost of the floppy discs is further increased because ceramic abrasive elements are expensive and their useful life is quite short because the removed magnetic oxide material tends to "build up" in the ceramic abrasive material, and also wears-out the ceramic material. Further, "wipers" may in some uses be required to remove debris consisting of abraded magnetic oxide particles from the recording surface to prevent such particles from contributing to scratching of the recording layer during the continuing passing of the recording surface under the abrasive member. Such wipers add complexity and expense to the burnishing process and the burnishing machinery.

It should be noted that the floppy disc industry is a very competitive industry, and cost savings of less than ½ cent per floppy disc are therefore very important. It is believed that the typical cost of the polishing operation for prior art floppy disc burnishing techniques is of the order of 10 cents per floppy disc.

Thus, there is a need for a means for producing floppy discs which are more uniformly burnished than presently available floppy discs. There is also a need for a technique and apparatus for burnishing floppy discs at much lower cost than presently available techniques and apparatus.

SUMMARY OF THE INVENTION

Accordingly, it is an object of the invention to provide a method and apparatus for uniformly burnishing annular or circular flexible recording elements, such as floppy discs.

It is another object of the invention to provide method and apparatus for reducing the cost of burnishing flexible recording elements, such as floppy discs.

It is another object of the invention to provide a simple method and simple apparatus for burnishing floppy discs.

It is another object of the invention to provide method and apparatus for burnishing floppy discs utilizing a burnishing medium having a relatively long life.

It is another object of the invention to provide a method and apparatus for burnishing a floppy disc without the use of a wiper to remove material abraded from the recording surface of the floppy disc during burnishing of the floppy disc.

Briefly described, and in accordance with one embodiment thereof, the invention provides a method and apparatus for uniformly burnishing an annular flexible recording element, such as a floppy disc, by producing uniform relative velocities between points of the floppy disc and corresponding points of a rotating burnishing element. The burnishing element is a circular or annular disc-shaped element disposed in torque-transmitting communication with a first rotating platen. The rotating floppy disc is disposed in torque-transmitting communication with a second rotating platen. The first and second platens rotate in the same angular direction, and are positioned so that a portion of the burnishing disc, not including the center thereof, overlaps a portion of the floppy disc. The relative velocity difference between the burnishing disc and the floppy disc at each point at which the burnishing disc contacts the surface of the floppy disc is equal to the sum of the linear velocities of the burnishing disc and the floppy disc at that point. The speed of rotation of the floppy disc and the burnishing disc are controlled such that the relative velocities between the burnishing disc and the floppy disc are uniform at points of contact between the floppy disc and the burnishing disc along points of the floppy disc. In one embodiment of the invention, a resilient disc of foam-like substance is disposed between the first platen and the floppy disc to sliplessly transmit torque from the first platen to the floppy disc. In another embodiment of the invention, the burnishing disc is composed of an industrial felt material. Separate motors drive the first and second platens. A speed control circuit controls the speeds of the first and second motors to produce the desired angular velocity and to produce the uniform relative velocity profile. A timer responsive to an initiating switch starts the motors and continues rotation thereof only for a predetermined time, after which time the burnishing operation is complete. The second platen and burnishing disc are slid away from the floppy disc along a spindle on which the second platen is slideably mounted to permit removal of the burnished floppy disc and replacement of it by an unburnished floppy disc.

DESCRIPTION OF THE INVENTION

Figure 1:
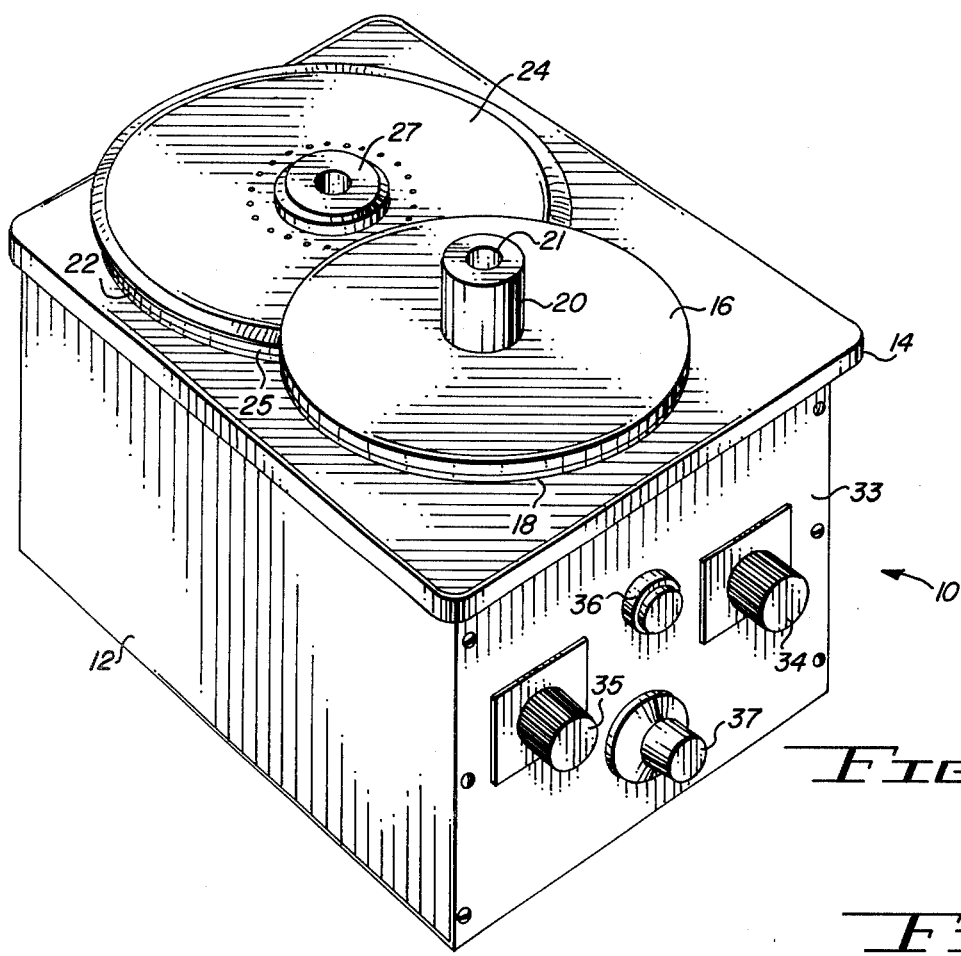
FIG. 1 is a perspective view of a floppy disc burnishing apparatus according to the invention.

A burnishing apparatus 10 for uniformly burnishing floppy discs is shown in FIG. 1. Burnishing apparatus 10 includes a rectangular housing 12 having a top plate 14. A first spindle 31, shown in FIG. 3, extends through an opening in top plate 14. Spindle 31 is driven by a first motor, as explained subsequently with respect to FIGS. 2 and 3. A first platen 22, which may be formed of aluminum, is mounted on first spindle 31. A thin, disc-shaped resilient pad 25 is mounted on a first platen 22 to transmit rotational torque to floppy disc 24.

Resilient pad 25 may be any suitable resilient material which sufficiently "sticks" to both first platen 22 and the underside of floppy disc 24 to sliplessly transmit the necessary torque to floppy disc 24 to permit the subsequently described burnishing process to be performed. It has been found that various foam-like resilient pads perform the desired function very well.

Figure 5:
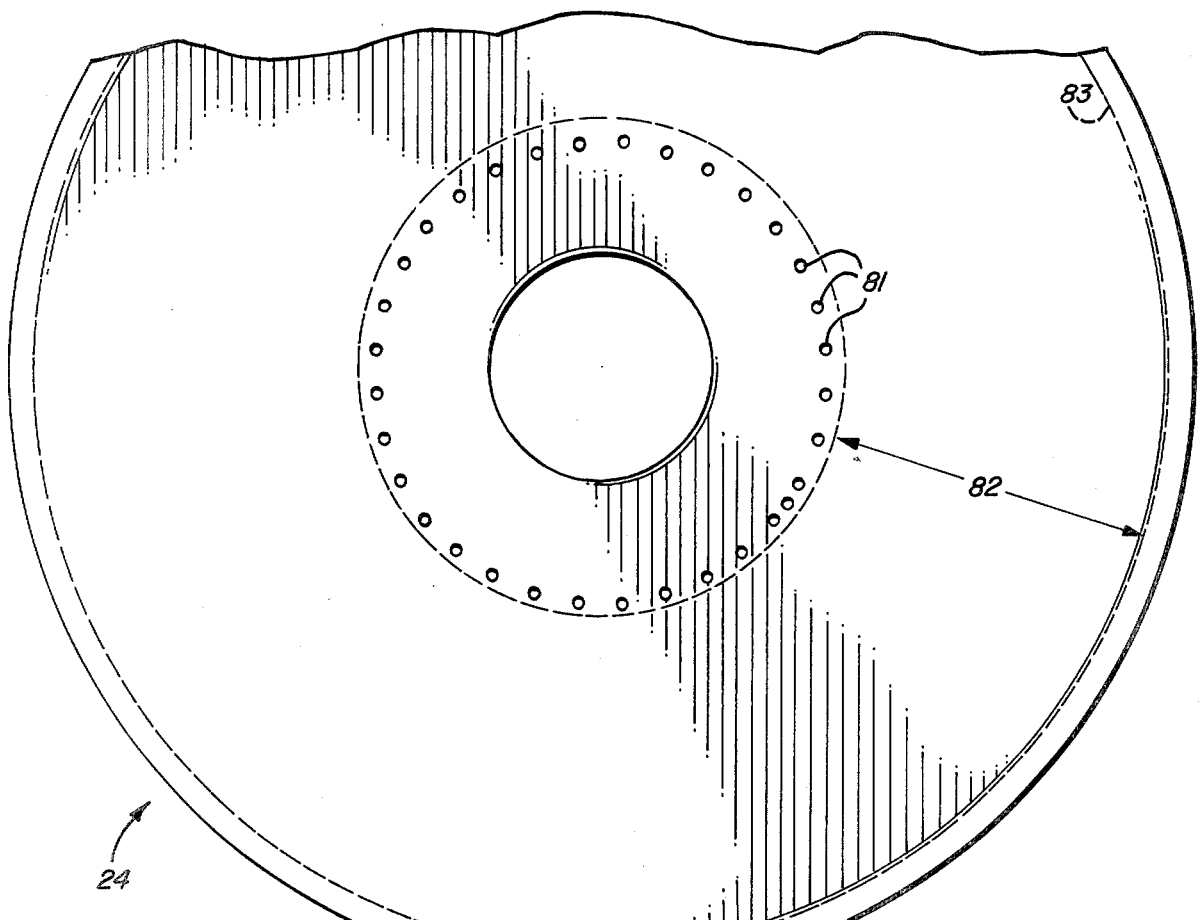
FIG. 5 is a plan view of a typical floppy disc.

Before describing burnishing apparatus 10 further, the floppy discs to be burnished will be briefly described. A plan view of a typical floppy disc 24 is shown in FIG. 5. Floppy disc 24 is an annular device, having a mylar substrate approximately 8 mils in thickness and a magnetic recording layer approximately 0.2 mils thick formed on both surfaces of the mylar substrate. Floppy disc 24 has an outside diameter of approximately 7⅞ inches; its central opening has a diameter of approximately 1¼ inches. The small openings, indicated generally by reference numeral 81, are utilized, in conjunction with optical electronics devices, to produce pulses to synchronize associated electronic circuitry with the rotation of the floppy disc. An annular region bounded by dotted lines 82 defines the region to be burnished by burnishing machine 10. Annular region 82 is approximately 2¼ inches wide.

An unpolished edge 83 of floppy disc 24 remains unpolished because the diameter of first platen 22 is preferably (in some cases) such that floppy disc 24 extends beyond the perimeter of first platen 22 by a distance equal to the width of unpolished edge 83. The reason for permitting unpolished edge 83 to extend slightly beyond the periphery of platen 22 is to eliminate the possibility that unpolished edge 83 may be "snagged" or eroded by burnishing disc 18, tearing fibers loose therefrom and possibly causing damage to floppy disc 24; in the absence of unpolished edge 83, erosion of the magnetic layer could in certain instances, begin at the outermost edges of the floppy disc due to the action of the burnishing disc and rapidly work its way inward.

Figure 2:
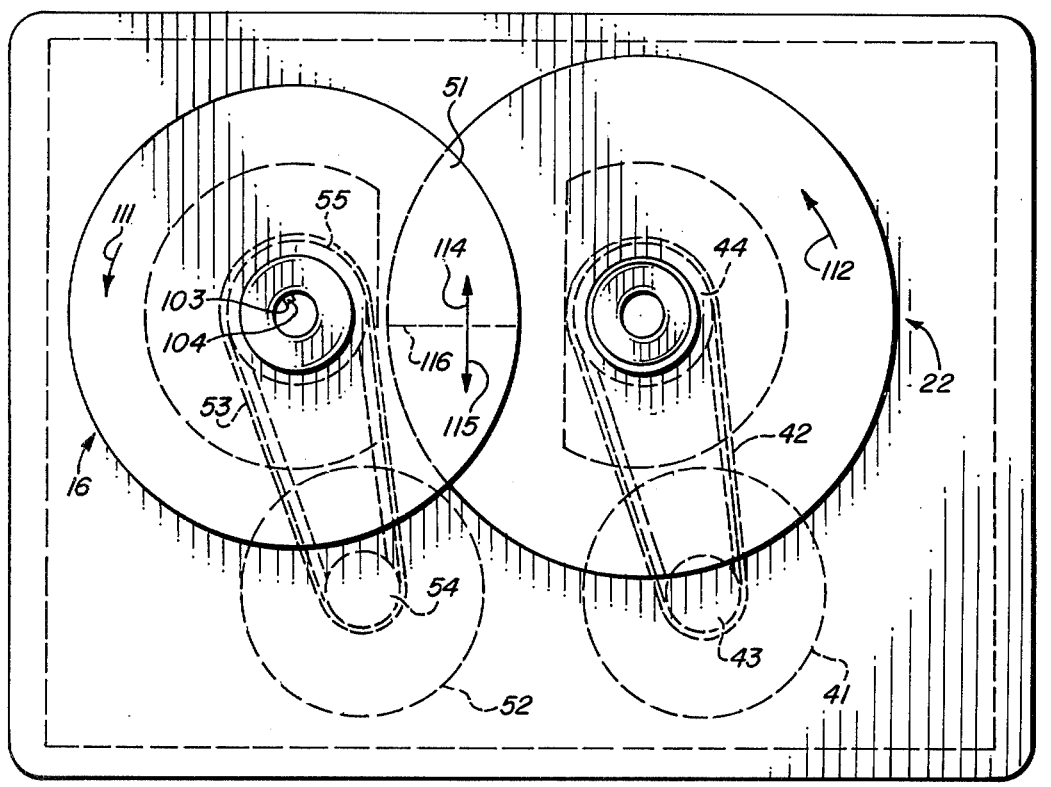
FIG. 2 is a top view illustrating various features of the apparatus of FIG. 1.
Figure 3:
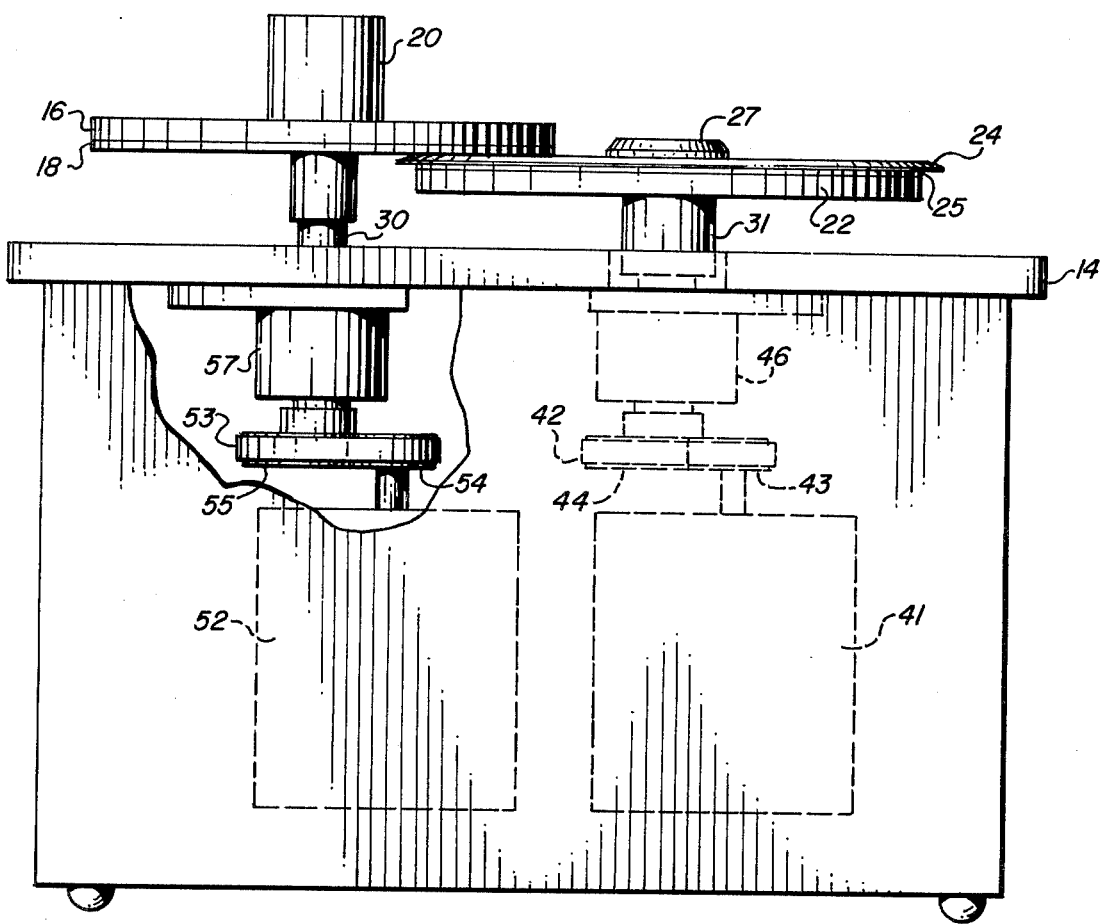
FIG. 3 is a side view illustrating various external and internal features of the embodiment of FIG. 1.

Referring now to FIGS. 1-3, cylindrical extension 27 of first platen 22 is machined, and has a diameter nearly as great as the diameter of the central opening of floppy disc 24, so that floppy disc 24 fits precisely over cylindrical extension 27. The upper edge of cylindrical extension 27 is slightly sloped to facilitate placing of floppy disc 24 over cylindrical extension 27 onto resilient pad 25. Resilient pad 25 is also concentrically disposed on first platen 22 over cylindrical extension 27.

Referring now to FIGS. 2 and 3, first motor 41 is coupled by means of belt 42 and pulleys 43 and 44 to drive first spindle 31. First spindle 31 is rotatably disposed within first bearing unit 46.

Referring again to FIG. 1, second platen 16 is mounted on second spindle 30. Second platen 16 has a tall cylindrical member 20 integrally associated therewith having an opening 21 therein which extends through both cylindrical member 20 and second platen 16.

Second spindle 30 is rotatably disposed in second bearing unit 57 and extends through a second opening in top plate 14 to rotate second platen 16. Second motor 52 is coupled by means of belt 53 and pulleys 54 and 55 to drive second spindle 30 and second platen 16. (Motors 41 and 52 may be Bodine model 10-AB-0 motors.)

Second spindle 30 has a longitudinal groove 103 therein into which an internal key 104 of second platen 16 is slideably positioned. Second platen assembly 16 can be slid upward along second spindle 30 until key 104 is positioned at the end of second spindle 30. Second platen 16 can then be rotated slightly such that the weight of second platen 16 and cylindrical member 20 may then be rested on the upper end of second spindle 30 by means of key 104. This facilitates removal of a burnished floppy disc and the replacement of an unburnished floppy disc on first platen 22.

A "burnishing disc" 18 is attached to the underside of second platen 16, so that when second platen 16 rotates, burnishing disc 18 rotates at the same speed.

When floppy disc 24 is positioned on resilient pad 25 of platen 22, and second platen 16 is then positioned so that key 104 slides downward into the groove 103 of second spindle 30, the weight of second platen 16 and cylindrical member 20 is supported by the overlapping portion 51 between burnishing disc 18 and a floppy disc on platen 22, as indicated in FIG. 2.

Burnishing disc 18 on platen 16 and a floppy disc on platen 22 are rotated in the same angular direction by means of motors 52 and 41, respectively, as indicated by arrows 111 and 112 in FIG. 2. (For convenience of illustration, neither burnishing disc 18 or floppy disc 24 appear in the top view shown in FIG. 2, but both are shown clearly in FIG. 3.)

Consequently, the relative angular velocities between points of burnishing disc 18 and adjacent points of floppy disc 24 are vectorially added, as indicated by arrows 114 and 115. The rotational speeds of motors 41 and 52 may therefore be selected to drive floppy disc 24 and burnishing disc 18 at rotational speeds which produce a substantially constant relative velocity difference between burnishing disc 18 and floppy disc 24 at contact points therebetween along dotted line 116. Consequently, substantially uniform burnishing of annular region 82 of floppy disc 24 is achieved.

Referring to FIG. 1, the controls on the front panel include floppy disc speed control 35, which adjusts the rotational speed of first platen 22. Burnishing disc speed control 34 enables an operator to adjust the speed of second platen 16 and burnishing disc 18.

Start button 36 permits the operator to initiate the burnishing operation after the floppy disc to be polished is in position and after second platen 16, cylindrical member 20, and burnishing disc 18 have been lowered so that their weight is supported at overlapping area 51 of the floppy disc on platen 22.

Timer control 37 is utilized to establish the number of seconds during which power is applied to first and second motors 41 and 52. Burnishing machine 10 operates for such period of time and then turns motors 41 and 52 off. Second platen 16 is then manually raised, and the burnished floppy disc is removed and replaced by an unburnished floppy disc.

Figure 4:
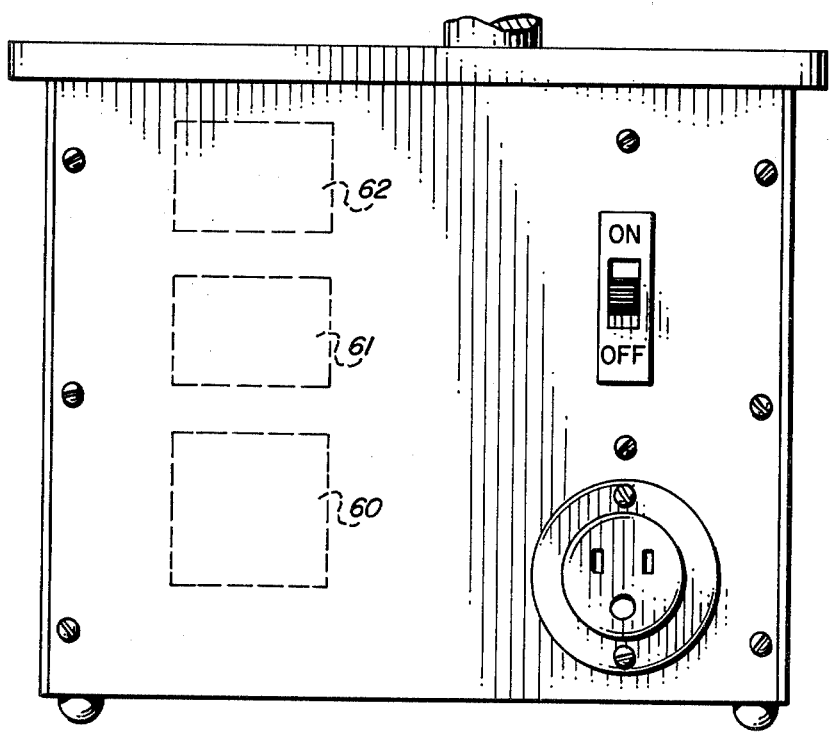
FIG. 4 is a diagram illustrating the back panel of the embodiment of FIG. 1 and also illustrating several internal features thereof.

FIG. 4 diagrammatically shows the back panel of burnishing machine 10. The back panel merely includes a power connector and an on-off switch. The dotted lines indicate the position of a time delay module 60 responsive to switch 36 and relays 61 and 62 responsive to speed control modules 92 and 93, shown in FIG. 6.

Figure 6:
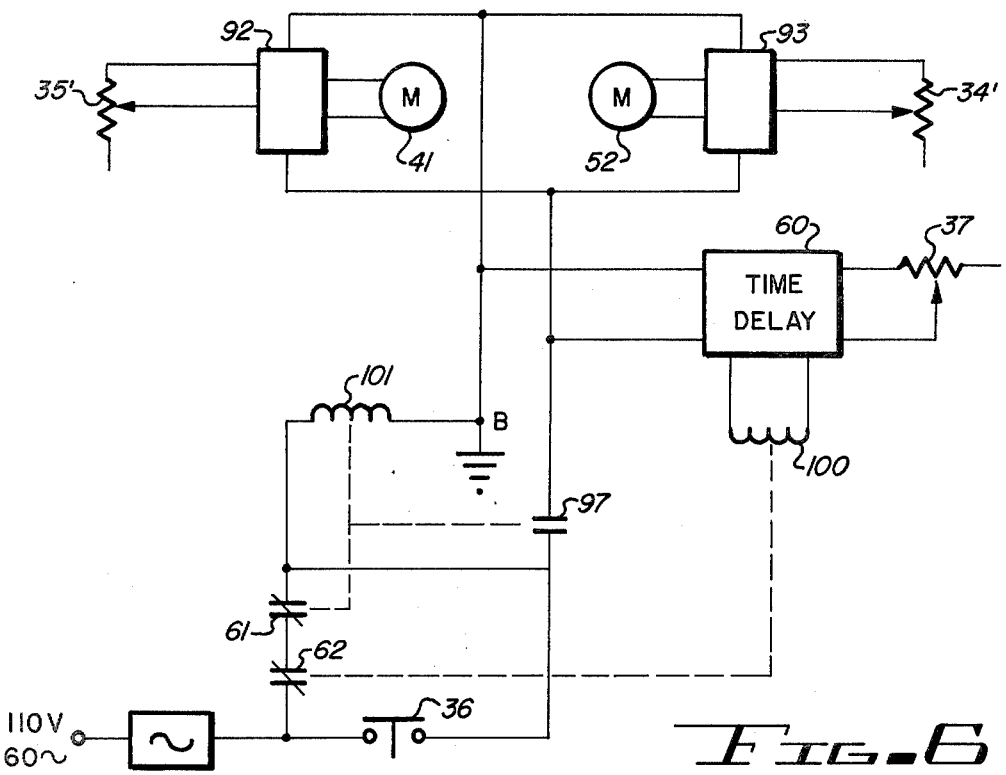
FIG. 6 is a partial block diagram showing the connection of the motors, speed control circuits, and timer circuit of the invention.

FIG. 6 shows a block diagram of the main electrical components of burnishing machine 10. Start switch 36 applies the external power source to time delay circuit 60. Time delay circuit 60 may be implemented by a number of commercially available timing circuits, including mode P/N 032-1046-6100, manufactured by Gardian Corporation. (Alternatively, various commercially available electro-mechanical timers may be utilized in place of time delay circuit 60.) When switch 36 is momentarily closed, the power is applied to time delay circuit 60, which activates relays 61 and 62, thereby applying power to speed control circuits 92 and 93. Speed control circuits 92 and 93 may be implemented by various speed control circuits which are commercially available, such as the Minarik model MB-659UK.

Speed control unit 92 operates to control the DC input voltage to DC motor 41 in response to potentiometer 35', which is controlled by control 35 on the front panel of burnishing machine 10, as shown in FIG. 1. Similarly, speed control circuit 93 controls the speed of motor 52 in response to potentiometer 34', which is controlled by control 34 of FIG. 1.

Burnishing disc 18 is preferably a fibrous burnishing disc. Fibrous burnishing discs have been found to be the most satisfactory type. An industrial grade felt known as "Red Felt" manufactured by Bueler Corporation has been found to be suitable. Burnishing discs having an outside diameter approximately equal to that of second platen 16 may be cut from the above "Red Felt" material, which is approximately ⅛ of an inch in thickness.

Other types of fibrous and/or abrasive burnishing discs have also been utilized in conjunction with the burnishing machine 10 of FIG. 1, with good results. Different types of burnishing materials appear to provide better burnishing results for floppy discs made by different manufacturers. However, an extensive investigation of the burnishing performance of a wide variety of fibrous materials for use as burnishing discs for all available brands of floppy discs has not, at this time, been undertaken. It is believed that relatively good results may be obtained for fibrous burnishing discs wherein the fibers are made of wool, cotton, nylon, rayon, linen, a fiberglass, or various combinations thereof.

It is not completely understood why fibrous burnishing discs produce such good results in the polishing of floppy discs, since the pressure per square inch of overlapping contact area between the burnishing disc 18 and the floppy disc 24 is far less than that of the "blade arrangement" of the above-mentioned IBM technical disclosure and the "ceramic cylinder approach" of above-mentioned U.S. Pat. No. 3,943,666.

The average time for obtaining a good uniform polished floppy disc for a "Red Felt" burnishing disc is approximately 20 seconds, when the rotational rates of the burnishing disc and the floppy disc are 900 and 630 rpm, respectively, and the weight of the upper platen assembly 16 is approximately slightly under 1 pound. The maximum spindle speed of the present machine is approximately 1800 rpm. The above rotational rates likely will be advantageously varied for various different burnishing materials and for different brands of floppy discs.

Although careful experiments regarding the effective varying weights of upper platen 16 have not been performed, it appears that increases in the combined weights of second platen 16 and cylindrical member 20 beyond approximately three pounds tend to have a diminishing effect on the amount of burnishing time required to obtain a good, uniform burnished surface in annular region 82 of floppy disc 24. Again, the optimum weight is expected to vary for various burnishing materials and brands of floppy discs.

The manufacturing yield of floppy discs burnished according to the present invention is believed to be significantly higher than for the prior art because of the uniform polishing inherent in the present invention, whereas there is a tendency for the outer portions of floppy discs polished by prior burnishing techniques to have more magnetic recording material removed than the inner portions. Further, the inner portions of such floppy discs may actually be underburnished, and may consequently have reduced reliability.

It has been found that the fibrous burnishing discs have much longer life, of the order of 100 hours, (corresponding to 100,000 floppy discs burnished) than the previously used ceramic cylindrical discs or blades, which are believed to have a useful life corresponding to the time required to burnish approximately 2500 floppy discs.

It should be noted that the cost of the Red Felt burnishing discs is low, being of the order of a few cents, whereas the cost of ceramic discs commonly utilized is of the order of one hundred times greater.

It should also be noted that the prior art techniques and apparatus require the use of a "wiper" such as wiper 24 shown in the above-mentioned IBM Technical Disclosure Bulletin reference to remove abraded particles of magnetic oxide so that said particles do not scratch the floppy disc as it makes repeated rotations past the abrading blade or rotating ceramic cylinder. In contrast, a "wiper" is not required for the above-mentioned fibrous burnishing discs used in burnishing machine 10 of the present invention. Apparently, the fibrous burnishing discs as used in accordance with the teachings of the present invention perform both the "wiping" and polishing functions adequately, such that the fibers break off smaller particles of magnetic oxide, which are less likely to scratch other portions of the magnetic recording surface as repeated rotations of the burnishing disc and the floppy disc occur. Apparently, the fibrous burnishing discs of the invention absorb such abraded magnetic oxide particles so that as the floppy disc makes repetitive passes past the rotating fibrous burnishing disc, any loose removed particles are absorbed by the fibrous burnishing disc, rather than being ground into the surface of the floppy disc, thereby scratching it.

Abrasive burnishing discs made of "burnishing paper" having 12 micron grit manufactured by 3M Corporation, and discs formed from a sandpaper layer formed on a foam backing, known as "polysand" have been found to burnish floppy discs quite well when used in conjunction with the above-described machine and method. However, these types of burnishing discs have a tendency to "load up" with material removed from the magnetic recording layer of the floppy discs comparatively quickly and therefore have shorter lifetimes than fibrous burnishing discs.

I claim:

1. A method of polishing an annular region of the recording surface of an annular flexible recording element to improve the surface smoothness, said method comprising the steps of:
   (a) supporting the recording element on a resilient surface capable of transmitting sufficient torque to said recording element to rotate said recording element about a first axis of rotation without significant slippage;
   (b) supporting a flat, circular polishing disc by means of a disc-shaped platen such that the recording surface of said recording element is exposed to said polishing disc, the radius of said polishing disc exceeding the width of the annular region of said recording surface, said polishing disc having a second axis of rotation parallel to said first axis;
   (c) moving a flat surface of said polishing disc into contact with the annular region of said recording element such that the contact is maintained by a predetermined force, the radial extent of the annular region being defined by the extent of the contact;
   (d) rotating said recording element about said first axis and said polishing disc about said second axis in the same angular direction at first and second predetermined angular velocities, respectively, for a predetermined period of time, said first and second predetermined angular velocities being selected to produce approximately uniform relative velocity differences between points of the recording surface of said recording element and adjacent points of the flat surface of said polishing disc, said points of the recording surface lying along a line passing through the axes of rotation of the disc-shaped platen and the polishing disc; and
   (e) moving said polishing disc away from said recording element to permit removal of said recording element from the resilient surface.

2. The method of claim 1 wherein said recording element is a floppy disc.

3. The method of claim 2 wherein said polishing disc is composed of fibrous felt material.

4. The method of claim 3 wherein said polishing disc has a diameter in the range from 4 inches to 8 inches, and a thickness in the range from 0.010 to 0.50 inches.

5. The method of claim 3 wherein the fibrous felt material fibers have diameters in the range from 0.0001 inches to 0.030 inches.

6. The method of claim 2 wherein said burnishing disc includes an abrasive polishing medium.

7. The method of claim 2 wherein said predetermined force is in the range from 0.5 pounds to 3.0 pounds.

8. The method of claim 2 wherein said first and second predetermined angular velocities are approximately 630 revolutions per minute and 900 revolutions per minute, respectively.

9. The method of claim 2 wherein said predetermined period of time is approximately 20 seconds.

10. The method of claim 2 wherein said predetermined period of time is in the range from 10 to 60 seconds.

11. The method of claim 2 wherein said polishing disc is composed of industrial burnishing paper having a grit particle size in the range from 1 to 30 microns.

12. A machine for polishing an annular region of a recording surface of an annular flexible recording element to improve the surface smoothness, said machine comprising in combination:
   (a) a resilient surface capable of transmitting sufficient torque to said recording element to rotate said recording element without significant slippage;
   (b) first means for supporting the non-recording surface of the recording element on said resilient surface, said first means having a first axis of rotation;
   (c) a flat, circular polishing disc;
   (d) second means for supporting said polishing disc such that the recording surface of said recording element is exposed to said polishing disc, the radius of said polishing disc exceeding the width of the annular region of said recording surface, said second means having a second axis of rotation parallel to said first axis;
   (e) third means for moving a flat surface of said polishing disc into overlapping contact with the annular region of said recording element such that the overlapping contact is maintained by a predetermined force, the radial extent of the annular region being defined by the extent of the overlapping contact;
   (f) fourth means for rotating said first means and said second means so that said recording element and said polishing disc rotate in the same angular direction at first and second predetermined angular velocities, respectively, for a predetermined period of time, said first and second predetermined angular velocities being selected to produce approximately uniform relative velocities between points of the recording surface of said element and adjacent points of a flat surface of said polishing disc, said points of the recording surface lying along a line passing through said first and second axes of rotation, respectively; and
   (g) fifth means for moving said burnishing disc away from said recording element to permit removal of the recording element from the resilient surface.

13. The machine of claim 12 wherein said fourth means includes first and second electric motors operatively coupled, respectively, to rotate the first and second means at said first and second predetermined angular velocities.

14. The machine of claim 13 further including first and second speed controls for setting said first and second predetermined angular velocities, wherein said fourth means further comprises speed control circuitry responsive to said first and second speed controls for maintaining the angular velocities of said first and second electric motors, respectively, at said first and second predetermined values.

15. The machine of claim 13 further comprising a timer control for setting said predetermined time and a start switch, wherein said fourth means further includes a timer element responsive to said start switch and said timer control for effecting coupling of electrical power to said speed control circuitry in response to activation of said start switch and for effecting decoupling of electrical power from said speed control circuitry at said predetermined time after the activation of said initiating switch.

16. The machine of claim 12 wherein said resilient surface is a surface of a foam-like pad disposed on said first means.

17. The machine of claim 13 wherein first means includes a first spindle and bearing assembly, a precision circular platen mounted axially on an end of said spindle, and a pulley mounted on an opposite end of said first spindle and belt driven by said first motor.

18. The machine of claim 17 wherein said second means includes a second spindle and bearing assembly, a second circular precision platen, an integral cylindrical hub slidably axially mounted on one end of said second spindle, and a pulley mounted on an opposite end of said second spindle and belt driven by said second motor, said second spindle having a groove therein, said integral hub having a key therein slidably cooperating with said groove to impart torque from said second spindle to said second platen and to permit sliding removal of said second platen and integral hub from said second spindle to effect mounting of said polishing disc on the surface of said second platen opposite said integral hub.

19. The machine of claim 18 wherein said polishing disc is mounted on the underside of said second platen such that when said second platen is slidably lowered onto said second spindle, the weight of said second platen and said hub is supported by the portion of said recording element overlapped by said polishing disc.

20. The machine of claim 19 wherein said recording element extends radially beyond the periphery of said first platen to prevent the extending portion from being burnished by said polishing disc.

21. The machine of claim 19 wherein weight of said second platen and integral hub is approximately 7/10 of a pound.

* * * * *